United States Patent
Maldziunas

(10) Patent No.: US 7,378,628 B2
(45) Date of Patent: May 27, 2008

(54) PHOTO RADIATION INTENSITY SENSOR AND METHOD THEREOF

(75) Inventor: Arvydas Antanas Maldziunas, Kaunas (LT)

(73) Assignee: Accel AB, Vänersborg (SE)

( * ) Notice: Subject to any disclaimer, the term of this patent is extended or adjusted under 35 U.S.C. 154(b) by 0 days.

(21) Appl. No.: 10/560,158

(22) PCT Filed: Jun. 24, 2004

(86) PCT No.: PCT/SE2004/001032

§ 371 (c)(1),
(2), (4) Date: Dec. 9, 2005

(87) PCT Pub. No.: WO2004/113853

PCT Pub. Date: Dec. 29, 2004

(65) Prior Publication Data

US 2006/0268262 A1    Nov. 30, 2006

(30) Foreign Application Priority Data

Jun. 24, 2003  (SE) .................................... 0301857

(51) Int. Cl.
*G01C 21/02* (2006.01)
*H01J 5/02* (2006.01)

(52) U.S. Cl. ................. 250/203.4; 250/239; 250/206.1

(58) Field of Classification Search ............. 250/203.4, 250/203.1, 203.3, 206.1, 206.2, 239, 252.1, 250/221, 203.6; 126/569, 573, 574, 578, 126/600–603, 605; 356/139.01, 140, 141.2, 356/141.5; 136/243, 244, 246, 251, 252, 136/259; 340/555–557, 541; 359/399
See application file for complete search history.

(56) References Cited

U.S. PATENT DOCUMENTS 3,293,440 A    12/1966    Mueller (Continued)

FOREIGN PATENT DOCUMENTS

DE    3144823    5/1983

(Continued)

OTHER PUBLICATIONS

"International Search Report for Application No. PCT/SE2004/001032, date mailed Sep. 28, 2004", 3 pgs.

(Continued)

*Primary Examiner*—Thanh X. Luu
*Assistant Examiner*—Pascal M Bui-Pho
(74) *Attorney, Agent, or Firm*—Schwegman, Lundberg & Woessner P.A.

(57) ABSTRACT

The present invention relates to a photo radiation intensity sensor (1) comprising a housing (2) having a lens (4), and a printed circuit board (7) placed in such way in the housing (2) that one of its edges (37) faces the lens (4), where at least a first and a second sensing element (5a, 5b) are placed at a first side (7') of the printed circuit board (7), where the first and second sensing elements (5a, 5b) are separated by a first flange (8), serving as a shading element. Further, at least a third sensing element (5'; 5c) is placed at a second side (7") of the printed circuit board (7), arranged to detect both the direction and the intensity of the radiation source and for producing corresponding output signals. The present invention also relates to a calibration and measurement method.

22 Claims, 13 Drawing Sheets

U.S. PATENT DOCUMENTS

| | | | |
|---|---|---|---|
| 3,493,765 A * | 2/1970 | Horn et al. | 250/206.2 |
| 4,225,781 A * | 9/1980 | Hammons | 250/203.4 |
| 4,297,572 A * | 10/1981 | Carlton | 250/203.4 |
| 4,361,758 A * | 11/1982 | Rotolo | 250/203.4 |
| 4,362,931 A * | 12/1982 | Maruko et al. | 250/203.4 |
| 4,445,030 A * | 4/1984 | Carlton | 250/203.4 |
| 4,494,526 A | 1/1985 | Wurst et al. | |
| 4,711,998 A * | 12/1987 | Malek | 250/206.1 |
| 4,804,832 A * | 2/1989 | Gardner | 250/206.1 |
| 5,022,930 A * | 6/1991 | Ackerman et al. | 136/251 |
| 5,072,105 A * | 12/1991 | Osawa | 250/206.1 |
| 5,117,744 A * | 6/1992 | Zimmer et al. | 454/75 |
| 5,153,429 A * | 10/1992 | Takahashi | 250/239 |
| 5,206,819 A | 4/1993 | Illing | |
| 5,264,691 A | 11/1993 | Hegyi | |
| 5,337,802 A | 8/1994 | Kajino et al. | |
| 5,367,441 A | 11/1994 | Wustlich | |
| 5,553,775 A * | 9/1996 | Kato et al. | 236/49.3 |
| 5,602,384 A | 2/1997 | Nunogaki et al. | |
| 5,670,774 A | 9/1997 | Hill | |
| 5,704,544 A | 1/1998 | Samukawa et al. | |
| 5,957,375 A * | 9/1999 | West | 236/91 C |
| 6,031,177 A * | 2/2000 | Voss | 136/244 |
| 6,084,228 A * | 7/2000 | Hill et al. | 250/203.4 |
| 6,087,650 A | 7/2000 | Dage | |
| 6,297,740 B1 | 10/2001 | Hill et al. | |
| 6,355,925 B1 * | 3/2002 | Robles et al. | 250/214 R |
| 6,379,013 B1 | 4/2002 | Bechtel et al. | |
| 6,396,040 B1 | 5/2002 | Hill | |
| 6,490,801 B1 * | 12/2002 | Hersom et al. | 33/268 |
| 6,781,106 B2 * | 8/2004 | Sumiya | 250/203.4 |
| 6,888,120 B2 | 5/2005 | Chiasson et al. | |
| 6,982,407 B2 * | 1/2006 | Hotta | 250/221 |
| 7,157,678 B2 | 1/2007 | Maldziunas et al. | |
| 2002/0056806 A1 | 5/2002 | Bechtel et al. | |
| 2005/0023466 A1 | 2/2005 | Maldziunas et al. | |

FOREIGN PATENT DOCUMENTS

| | | |
|---|---|---|
| EP | 0625692 | 5/1994 |
| EP | 0625692 A1 | 11/1994 |
| EP | 0852189 A2 | 10/1997 |
| EP | 0852189 A2 | 7/1998 |
| JP | 2298828 A | 12/1990 |
| WO | WO-90/07102 | 6/1990 |
| WO | WO-9007102 | 6/1990 |
| WO | WO-9924951 | 5/1999 |
| WO | WO-2004113853 | 12/2004 |

OTHER PUBLICATIONS

"Written Opinion of the International Preliminary Examining Authority for Application No. PCT/SE2004/001032, date mailed Jun. 21, 2005, 6pgs."

* cited by examiner

PHOTO RADIATION INTENSITY SENSOR AND METHOD THEREOF

CROSS-REFERENCES TO RELATED APPLICATIONS

This application is a U.S. National Stage Filing under 35 U.S.C. 371 from International Application No, PCT/SE2004/001032, filed Jun. 24, 2004, and published on Dec. 29, 2004 as WO 2004/113853 A1, which claimed priority to Sweden Application No. 0301857.9, filed Jun. 24, 2003, which applications and publication are incorporated herein by reference.

TECHNICAL FIELD

The present invention relates to a photo radiation intensity sensor comprising a housing having a transparent or translucent portion, and a printed circuit board placed in such way in the housing that one of its edges faces the transparent or translucent portion, where at least a first and a second sensing element sensitive to radiation are placed at a first side of the printed circuit board, where the first and second sensing elements are separated by a first flange, serving as a shading element.

The present invention also relates to a calibration and measurement method which is adapted for the photo radiation intensity sensors according to the invention.

BACKGROUND ART

Fully automated climate systems in vehicles are commonly used in vehicles. Originally such climate systems used single or multiple temperature sensors sensing the temperature in the cabin and regulated the airflow in dependence of the temperature measured by said sensors. However, the influence of the radiation of the sun is not adequately compensated for when using only a temperature sensor. Therefore it has been suggested to make use of radiation sensors, which measures the impact of the sun. Further improvements have resulted in sensors, which identifies the position of the sun in relation to the vehicle in order to further improve the regulation of the climate unit. Such sensors are known from inter alia WO 90/07102, U.S. Pat. Nos. 5,337,802, 5,553,775, 5,117,744 and EP 852 189. The sensing elements described in these documents all include multiple sensing elements arranged in a housing, where said sensing elements are sensitive to light. The sensing elements are arranged at different geometrical positions of the sensor housing, whereby a sensitivity of the direction of a light source in relation to the sensor can be established. The sensors preferably also include shading elements, which prevent light from reaching one of the sensing elements when impinging from certain positions. By measuring the difference in altitude of the output signal from each of the sensing elements, an estimate of the position of the light source In relation to the sensor is calculated.

A typical response from a prior art sensor having two sensing elements is shown in FIG. 1. The sensor in the example includes a first and second sensing elements positioned in a housing in a manner such that light is blocked from reaching one of the sensing elements if impinging from a first direction and the light is blocked from reaching the other sensing element if impinging from a second opposite direction. A first left curve corresponds to the output signal produced by the first sensing element and a second right curve is produced by the second sensing element. The curves are overlapped in a small region corresponding mainly to a position where the light source impinges vertically on the sensing element. The magnitude of the signals each has a peak value outside side overlapping region and thereafter are steeply reduced to a small fractional value of said peak value. A problem with the sensor type producing such an output signal is that the position of the light source cannot be determined with accuracy outside the overlapping region. It is true that the output signal outside the overlapping interval has a magnitude dependent on the position, however, it is not possible to judge whether a small output signal is dependent on the position of the sun or if it depends on the intensity of the sun. In order to discriminate between these two variables it is necessary to have output signals from both sensing elements.

A typical response from a prior art sensor having a single sensing element is shown in FIG. 2. The output at low angles is typically low in relation to the output from vertically impinging radiation. Since heating problems in car interiors are mostly occurring at impinging angles of about 30-80°, this type of sensor does not conform well for the purpose of detecting a heating effect.

Generally, in order to detect the magnitude of the flux of the photo radiation it would be advantageous to have a sensor that has a response from different impinging angles which is as flat as possible. In the event a totally flat output could be generated the output would directly indicate the magnitude of the flux of the photo radiation.

Prior art sensor having four sensing elements still do not provide a perceptible signal from each sensing element at all azimuths and elevations, i.e. from every point in the hemisphere. This results in that the precision of the measurement is decreased, being dependent on at which azimuth and elevation the detection currently is being made.

Furthermore, the prior art sensors disclose quite complicated structures, which are expensive to manufacture. The prior art sensors also suffer from differences between each individual sensing element and geometrical misalignments during assembling.

DISCLOSURE OF INVENTION

It is an object of the present invention to provide a solar sensor which is not sensitive regarding differences between each individual sensing element and geometrical misalignments during assembling, and which is relatively simple and inexpensive to manufacture.

It is also an object of the present invention to provide a low cost sensor which does not suffer from low sensitivity at low angles of elevation.

It is also an object of the present invention to provide a sensor which is relatively inexpensive to manufacture.

This object is solved by means of a photo radiation intensity sensor according to the introduction. The sensor further comprises at least a third sensing element sensitive to radiation is placed at a second side of the printed circuit board, where said sensing elements are arranged to detect both the direction and the intensity of the radiation source and for producing output signals which are used for estimating the sun radiation heating impact, and where the printed circuit board is arranged in such a way that it functions as a shading element between the areas on its first and second side where the sensing elements are mounted.

This object is also solved by means of a calibration and measurement method as disclosed in the appended claims 17 and 19, respectively.

A number of advantages are obtained by means of the present invention. For example, a photo radiation intensity sensor using only three sensing elements is made possible by means of the calibration and measurement procedure according to the invention;

a radiation intensity sensor that is not sensitive regarding differences between each individual sensing element by means of the calibration and measurement procedure according to the invention;

a radiation intensity sensor which is relatively simple and inexpensive to manufacture.

BRIEF DESCRIPTION OF DRAWINGS

Embodiments of the invention will be described in detail below, with references to appended drawings where.

EMBODIMENTS OF THE INVENTION

Figure 1:
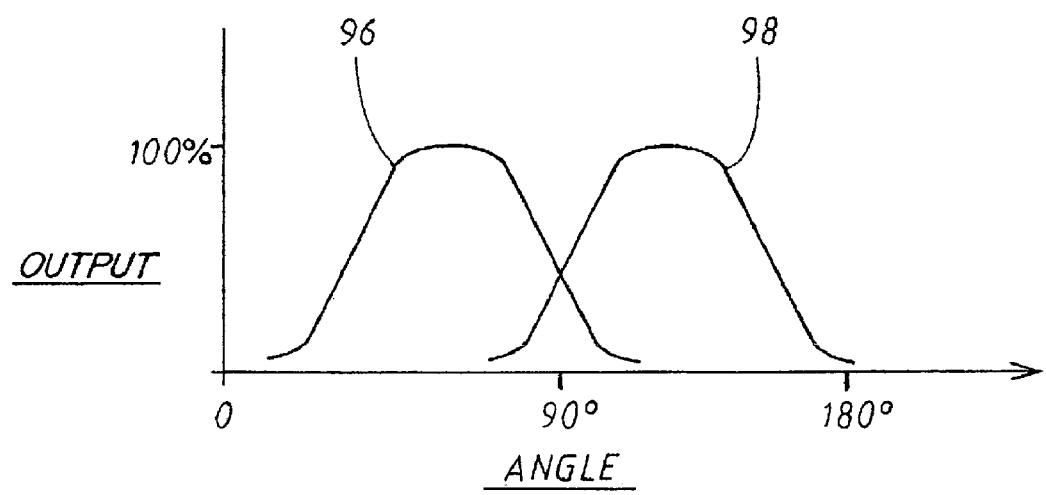
FIG. 1 shows a typical output signal from a prior art sensor having two sensing elements.
Figure 2:
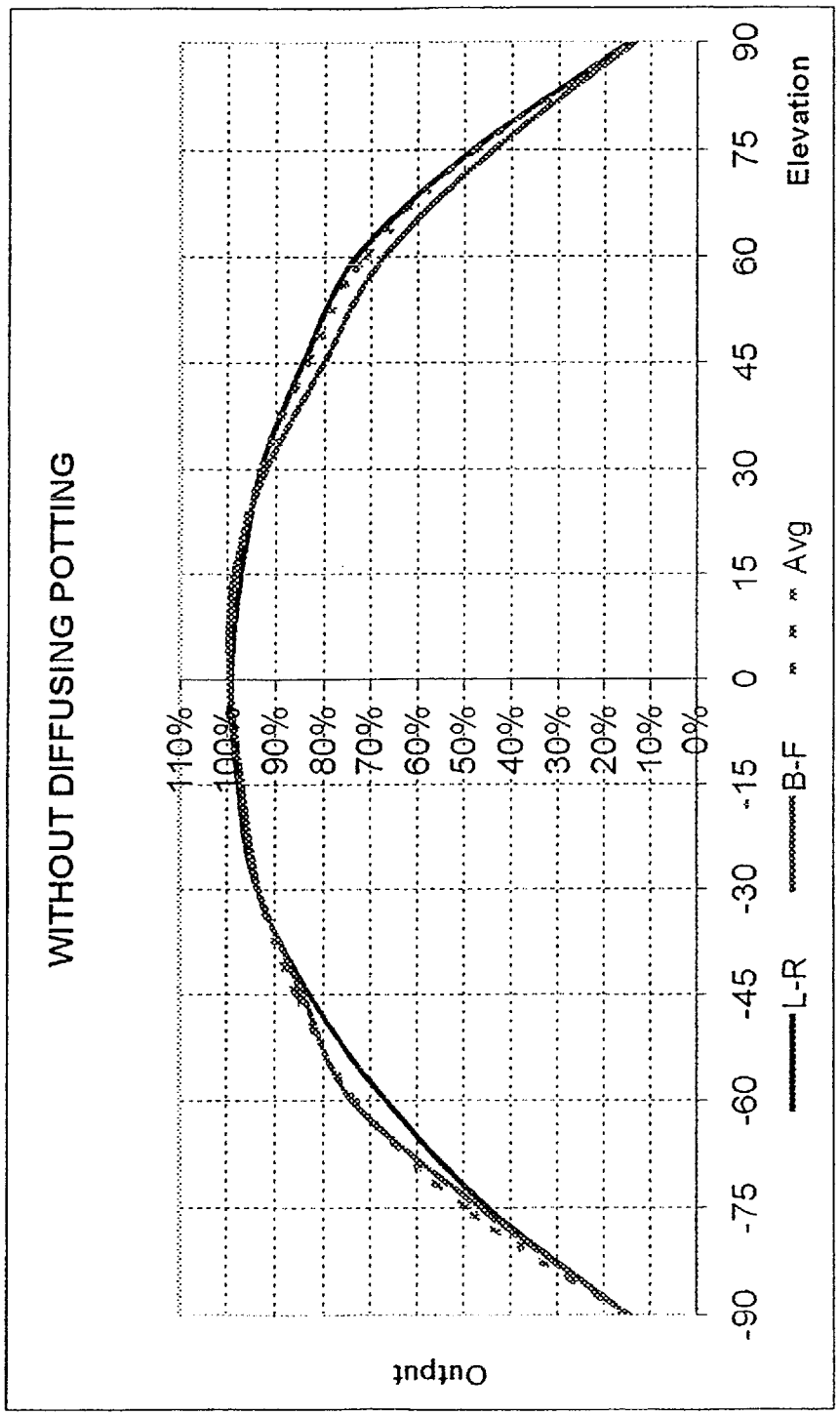
FIG. 2 shows a typical output signal from a prior art sensor having a single sensing element.
Figure 3:
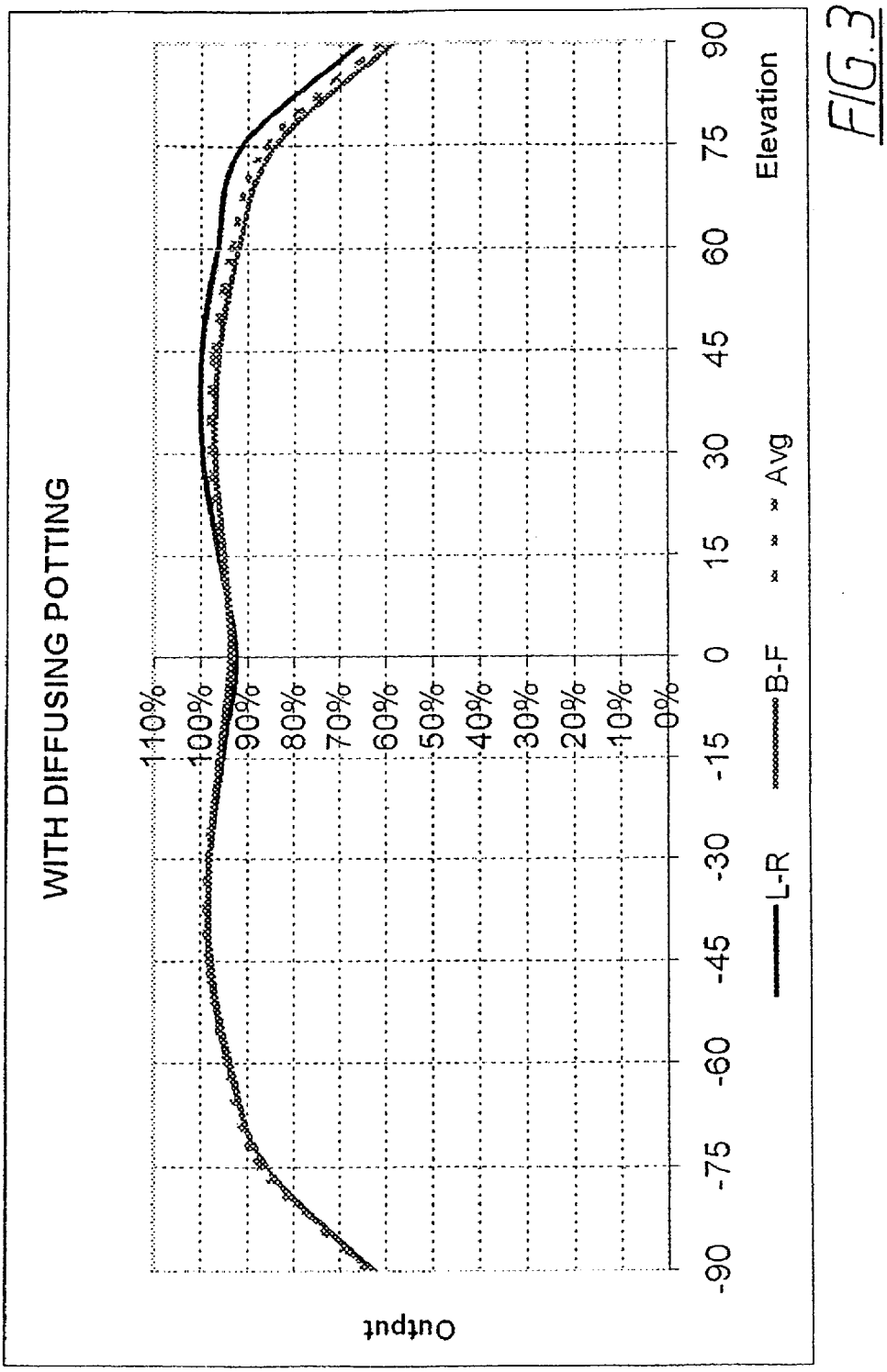
FIG. 3 shows a typical output signal from a sensor according to the invention having a single sensing element and a diffusive compound positioned between an aperture of the sensor and the sensing element.

In FIG. 3, a typical output signal from a sensor according to the invention having a single sensing element and a diffusive compound positioned between an aperture of the sensor and the sensing element is shown.

Figure 4:
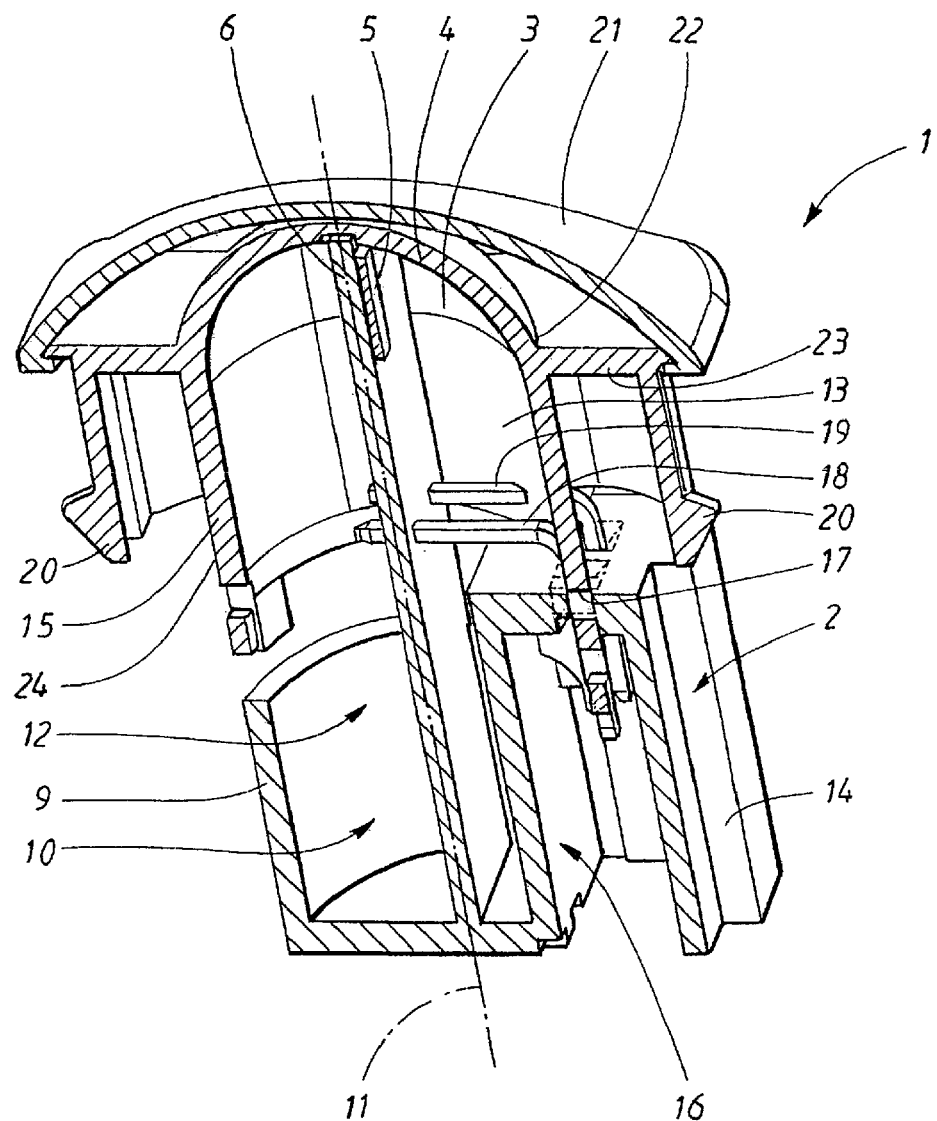
FIG. 4 shows a first embodiment of an photo radiation intensity directional sensor according to the invention.

In FIG. 4, an embodiment of an photo radiation intensity directional sensor 1 is shown. The directional sensor comprises a housing 2 having an opening 3, which is covered by a lens element 4. The lens element 4 is transparent or translucent. In a preferred embodiment, the lens element function as a radiation filter being transparent to radiation within a well-defined frequency interval. The lens element 4 is in the shown embodiment dome shaped.

The sensor 1 further includes an array of sensing elements 5 distributed within said housing 2. A shading element 6 at least partly block light from impinging directly on one of two sensing elements within said array of sensing elements 5 separated by said shading element. In the shown example, the sensing elements 5 are positioned on opposite sides of the shading element 6 formed by a printed circuit board 7 carrying the sensing elements and other electronic components used in the sensor. In the embodiment shown in FIG. 7, the printed circuit board 7 and two flanges 8, 8', vertically extending from said printed circuit board 7, form shading elements. A more detailed description with reference to FIG. 7a-c will be disclosed later in the application.

The housing 2 of the photo radiation intensity directional sensor 1 is in the shown embodiment formed by outer walls 9 forming a substantially cylindrically shaped internal cavity 10, where the shading element 6 is positioned. The shading element 6 is extending along a symmetry axle 11 of the cavity 10 and divides the cavity 10 into separate sub compartments 12, 13. The housing is in the shown example formed by a lower through shaped part 14, which is tightly connected to an upper part 15, which includes the lens element 4. In the case the upper part 15 and the lens element 4 are integrally formed, a portion of the upper part 15 not forming the lens must be prevented from exposure to light. This can be done by positioning the dome shaped lens element 4 into an opening 22 of a non-transparent cover plate 23. Another possibility is to arrange a non-transparent covering material 24 around the lower cylindrical part of the upper part 15.

The lower part 14 comprises a web portion 16 extending into the cylindrically shaped internal cavity. The web portion 16 is provided with openings 17 through which electrical connectors 18, 19 to the electronic components, including the sensing elements 5, are extending.

The upper part 15 is provided with a snap lock mechanism 20 arranged for securing the photo radiation intensity directional sensor 1 in a recess in a vehicle. The photo radiation intensity directional sensor 1 is furthermore equipped with a lid 21, which facilitates the freedom of design of parts of the photo radiation intensity directional sensor, which are visible after mounting of the photo radiation intensity directional sensor in a vehicle.

The cavity 10 forms a chamber containing a diffusive compound (not shown) positioned between said lens and said array of sensing elements. The compound is preferably a potting in the form of a liquid or a gel, which is filled into the cavity 10, preferably in such a way that the compound is flooding the cavity 10. Preferably the compound is more or less liquid in order to enable the filling into the cavity 10, and may be of such a composition that it cures when the filling procedure is completed. The curing may be of such a nature that the compound, being a liquid of a relatively low viscosity, cures to a liquid of higher viscosity, for example a gel. The curing may also result in a solid compound In a test example the following diffusive compound has been used:

Wacker SilGel 612 with small quantity of Elastosil white colour paste FL; Wacker SilGel 612 is of two liquid components (A and B), which together cure to gel of high optical transparency; when adding small amount of Elastosil white colour paste FL (0.1% to 1% by weight) this gel becomes opaque ("milky") with good diffusive properties of photo radiation; concentration of this paste also can be used for control of sensitivity of sensor in aggregate: when increasing percentage of paste—sensitivity decreases and vice versa.

Wacker SilGel 612 is a two part crosslinking silicone rubber. Elastosil is a mixture of pigments and a reactive silicone polymer. Both are trademarks of Wacker.

Figure 16:
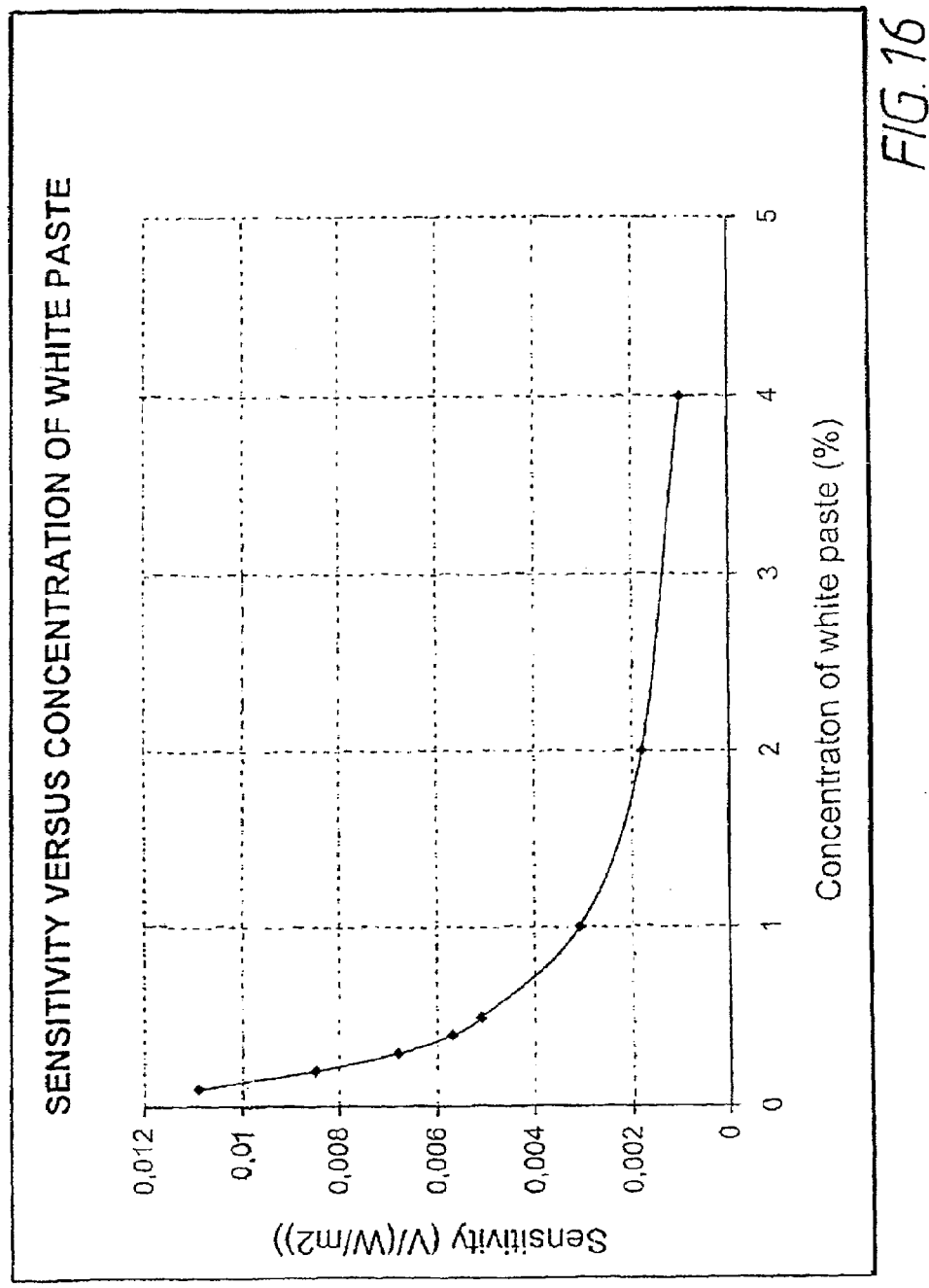
FIG. 16 shows a diagram of sensitivity versus concentration of white paste in compound.

In FIG. 16, a diagram of sensitivity versus concentration of white paste in compound. Tests has shown that a concentration between 0.1%-1% provides adequate degree of opaqueness for providing uniform output level for a single sensor body without reducing the output level too much.

Figure 5:
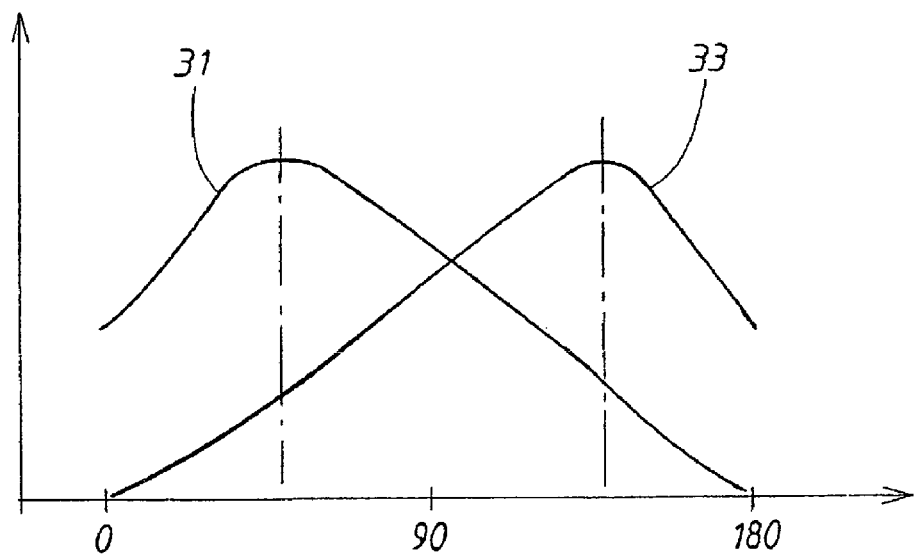
FIG. 5 shows an output signal from an photo radiation intensity directional sensor according to the invention.

In FIG. 5, an output signal from an photo radiation intensity directional sensor according to the invention is shown.

Figure 6:
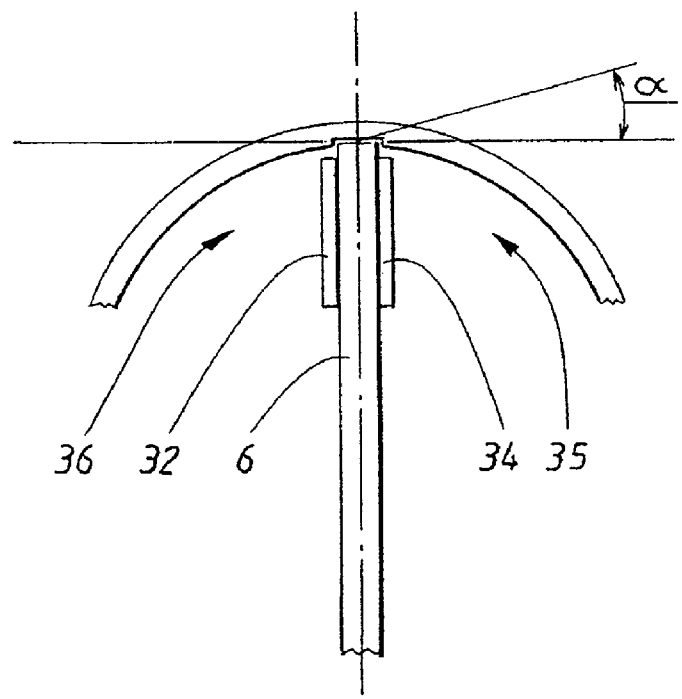
FIG. 6 shows a schematic example of an a ray impinging at an angle of α degrees toward a right hand side of a housing according to the invention.

The curve includes a left portion 31 originating from a left hand sensing element 32 (FIG. 6) and a right portion 33 originating from a right hand sensing element 34. The sensing elements 32, 34 are positioned on opposite sides of a shading element 6. An example of an photo radiation beam impinging at an angle of α degrees from the right hand side is shown in FIG. 6. When α=0° photo radiation is diffused by the diffusive compound 35 contained in the chamber 36 surrounding the sensing elements 32, 34 and thereby providing an output signal from the right hand signal at a medium magnitude. The output signal when α=0° is at a zero magnitude from the left sensing element 32. As soon as α>0°, the left sensing element 32 provides an output signal, which at small α is generally proportional to α. This is due to the fact that even at small α the diffusive compound 35 is exposed to photo radiation at the left hand side. The photo radiation impinging on the left hand sub compartment is directed by diffusion to the sensing element. If the diffusive compound were absent, the output signal would be equal to zero at low altitudes.

For small α, the magnitude of the output signal of the right sensing element is continuously increasing until approximately α=45°, where the right hand sensing element has its peak value. The left hand sensing element 32 provides an output signal, which continuously increases until approximately α=135°, where the left hand sensing element has its peak value. By the inclusion of the diffusive compound inside the housing the overlapping range is extended to 180°. Using the vertical position of the sensing elements as shown in the example, the overlapping range would essentially equal zero if the diffusive compound is not included. Due to the diffusion, the output signal of the sensing elements is essentially independent of the position of a surface normal of the sensing element in the housing in contrast to the situation when no diffusive compound is used.

Figure 7A:
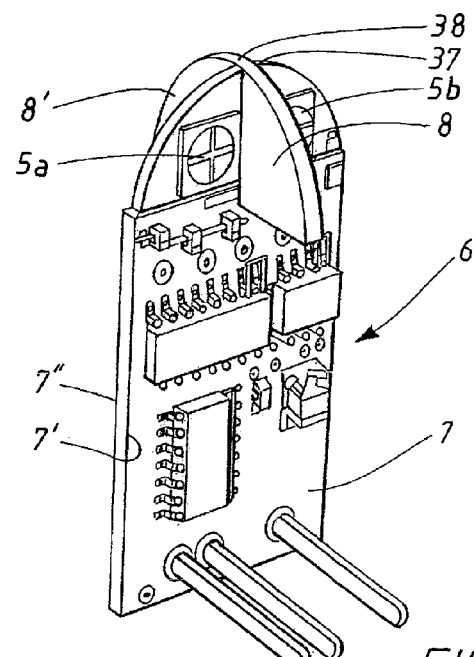
FIG. 7a shows a perspective view of a printed circuit board carrying the sensing elements used in the first embodiment described in FIG. 4, FIG. 7b schematically shows a top view of a solar sensor according to the first embodiment, FIG. 7c schematically shows a sectional side view of a solar sensor according to the first embodiment.
Figure 7B:
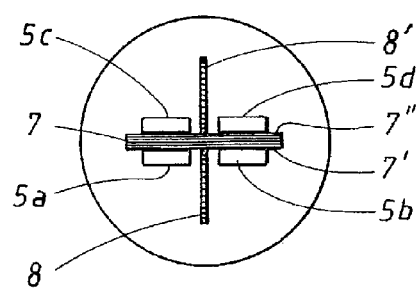

With further reference to FIGS. 7a and 7b, a multidirectional solar sensor printed circuit board 7 with mounted components corresponding to the embodiment shown in FIG. 4 is shown. The printed circuit board 7 is provided with four sensing elements, a first 5a and a second 5b sensing element on a first side 7' of the printed circuit board 7, and a third 5c and a fourth 5d sensing element on a second side 7" of the printed circuit board 7. The printed circuit board 7 is further provided with the flanges 8, 9, which are placed between the first 5a and second 5b sensing element and also between the third 5c and fourth 5d sensing element. The flanges, which work as shading elements, may be constituted by one single part that is placed into a slot in the printed circuit board 7, as shown in FIG. 7. Then both the printed circuit board 7 and the flanges 7, 8 function as shading elements for the four sensing elements 5a-d.

With reference now also to FIG. 4c, the ends 37, 38 of the printed circuit board 7 and the flanges 8, 9, respectively, that are intended to face the lens element 4 are also dome-shaped, mainly following the shape of the lens element 4. The lens element 4 that is intended to cover the sensor is not in direct contact with the printed circuit board end 37 and the flange end 38 when mounted, there is a small gap 39 between the shading elements 7, 8, 9 and the lens element 4, which gap 39 is filled with the diffusive compound 35. This small gap 39 results in that at least a small signal is received from every sensing element 5a-d, independently of from which angle the source of radiation incides. The small gap 39 has a certain size, which size is determined experimentally with the intention to acquire a plot of the output signal amplitude versus the azimuth angle, which plot is as close as possible to sinusoidal. This plot is described more in detail below.

In order to compensate for all deviations that may occur, which deviations for example may be due to different properties of each individual sensing element, corrections will have to be done. These corrections are performed for each individual solar sensor 1 as a part of the manufacturing process, where test measurements are performed, and correction values are fed into a digital memory in the solar sensor 1 in question. In the example below, test measurements described are performed for a solar sensor 1 according to FIG. 7, i.e. a solar sensor 1 having four sensing elements 5a-d.

During the test measurements, the whole solar sensor 1 is rotated 360° in azimuth under a fixed light source. The solar sensor 1 is also rotated from 0° to 90° in elevation under the light source. The rotation takes place in fixed steps, for example steps of 10°, resulting in 36 steps for azimuth and 10 steps for elevation. For each elevation step, all the azimuth steps are measured, and each measurement results in four values, one from each sensing element 5a-d.

Figure 9:
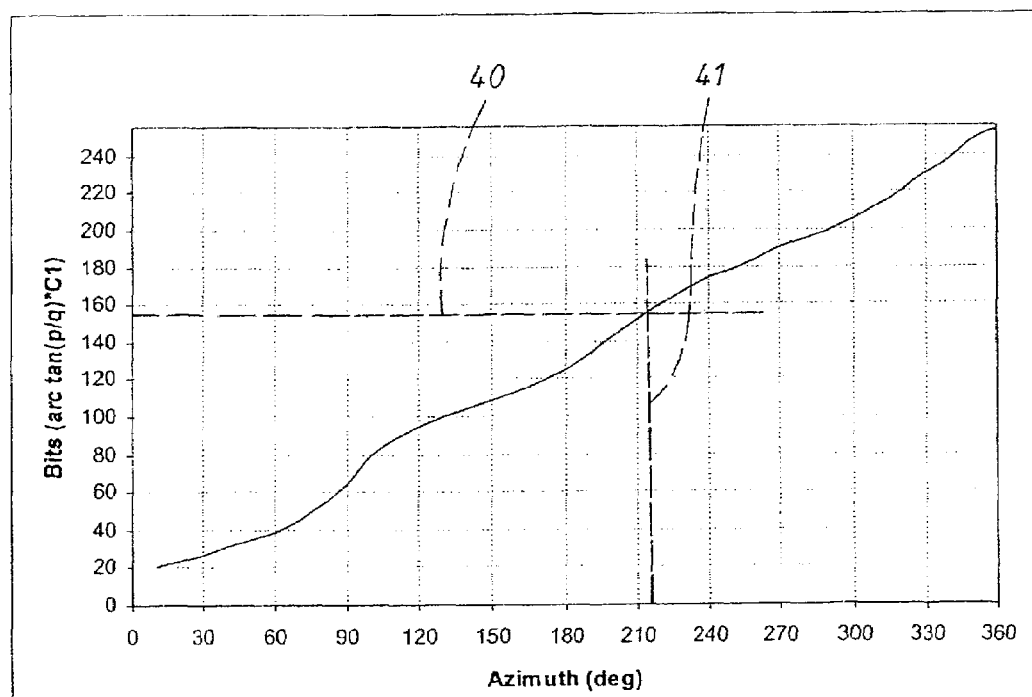
FIG. 9 shows a graph of azimuth angle correction coefficients.
Figure 10:
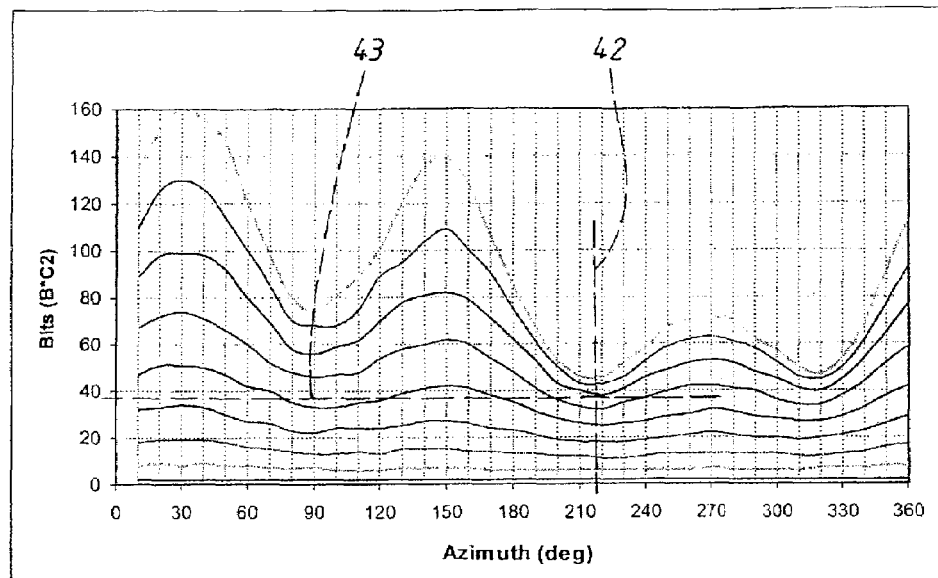
FIG. 10 shows a graph of elevation angle correction coefficients.
Figure 11:
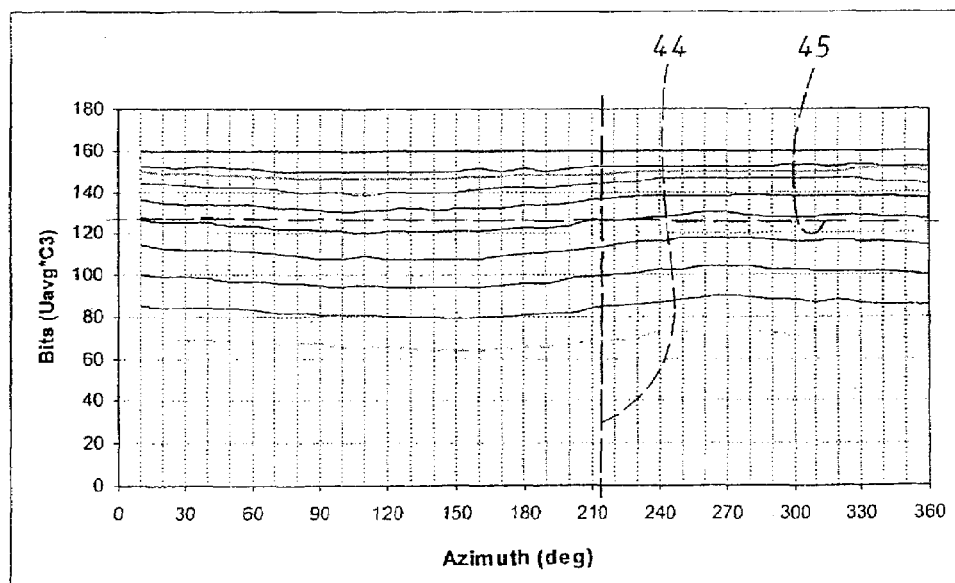
FIG. 11 shows a graph of intensity correction coefficients.

The acquired data amount is saved in the form of tables and compared with those of an ideal solar sensor. From this comparison, correction coefficients are calculated. Tables containing these correction coefficients, which tables are converted into graphs, shown in FIG. 9-11, are then stored in a digital memory for every individual solar sensor. The memory may be a flash memory. Necessary software is also stored. Necessary processing equipment such as a microprocessor or microcontroller is also comprised in each individual solar sensor. These circuits are not shown explicitly in the figures, but are preferably mounted on the printed circuit board 7.

The first step during the sensing process is to measure all output values U1, U2, U3, U4 from the four sensing elements 5a-d, and saving the measurement values to a digital memory. The second step is to calculate an average value $U_{avg}$ of the signal acquired from all the sensing elements 5a-d, which average value $U_{avg}$ is proportional to the intensity of the detected radiation. In an ideal case, the average value $U_{avg}$ should not be dependent on the light source direction.

The third step is intended to be a part of the determination the direction of the light source. Here, the differences between output signals of the opposite sensing elements is calculated, i.e. U1-U3 and U2-U4. The fourth step is to calculate normalized values p and q, independent of the intensity of the radiation. These values are calculated as:

$$p=(U1-U3)/U_{avg}$$

$$q=(U2-U4)/U_{avg}$$

Figure 8:
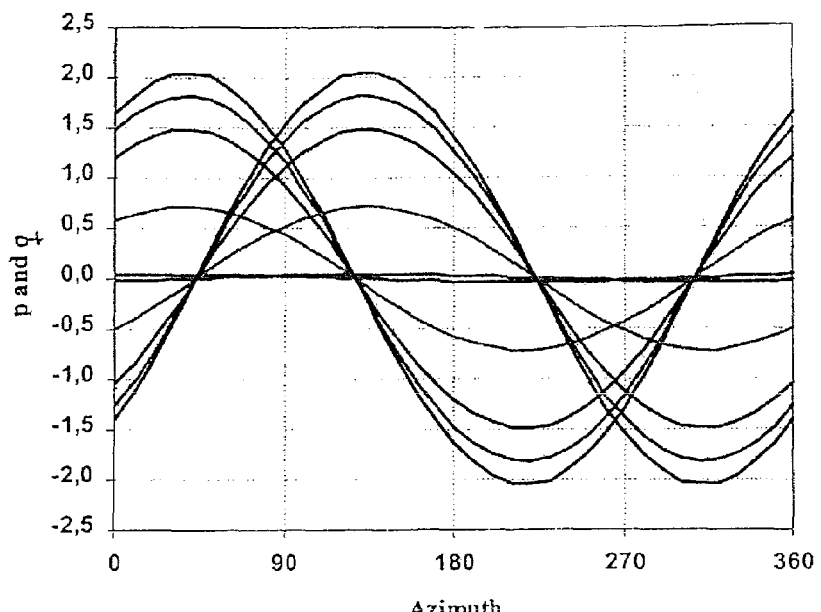
FIG. 8 shows a graph of normalized difference values.

In FIG. 8, plots of p and q are shown for a number of elevation angles. These plots ideally follows the formulas p=B sin(A) and q=B cos(A). A is the azimuth angle and B is a function of the elevation angle in question.

The real graphs, however, are not ideal sinusoids, and their amplitudes B are not directly proportional to the elevation angle in question. Therefore, the correction coefficients disclosed above will have to be used.

Having these correction coefficients determined, the fourth step during the sensing process is to calculate the relative azimuth values. As stated above, $$p=B\sin(A)$$

$$q=B\cos(A)$$

Dividing p with q gives:

$$p/q=\tan(A)$$

which in turn results in:

$$A=\arctan(p/q)$$

A coefficient $C_1$ is used as a scaling factor, resulting in the final expression for the relative azimuth angle:

$$A_z=C_1 \arctan(p/q)$$

The fifth step is to determine the absolute azimuth angle value. This calculated value $A_z$ is read on the Y-axis in the correction coefficient table graph in FIG. 9, an example is indicated by a first dotted line 40, parallel to the X-axis. Where the first dotted line intersects the correction coefficient graph, a second dotted line 41, perpendicular to the first dotted line 40, indicates the corrected absolute value for the azimuth angle $A_{corr}$, in degrees (or radians), on the X-axis, as the second dotted 41 line crosses the X-axis.

The sixtth step during the sensing process is to calculate the relative elevation angle values. As stated above, $$p=B\sin(A)$$

$$q=B\cos(A)$$

As known from trigonometry, $\sin^2(A)+\cos^2(A)=1$
Raising p and q to the second power yields $$p^2=B^2\sin^2(A)$$

$$q^2=B^2\cos^2(A)$$

Addition yields $$p^2+q^2=B^2\cos^2(A)+B^2\sin^2(A)=B^2(\cos^2(A)+\sin^2(A))=B^2$$

Thus $$B=\sqrt{p^2+q^2}$$

A coefficient $C_2$ is used as a scaling factor, resulting in the final expression for the relative elevation angle E:

$$E=BC_2$$

The seventh step is to determine the absolute elevation value. FIG. 10 shows a number of elevation graphs. By continuing the example, the corrected value for the azimuth angle $A_{corr}$ is indicated on the X-axis scale with a third dotted line 42, parallel to the Y-axis. The processor calculates the relative value of the elevation angle E, according to the relationship $E=BC_2$ as stated above, which value E is indicated on the Y-axis scale with a fourth dotted line 43, parallel to the X-axis. Where the third 42 and fourth 43 dotted line intersect, an appropriate elevation angle curve is selected, where each elevation angle curve represent a certain absolute elevation angle.

The eighth step during the sensing process is to calculate the relative intensity values. A coefficient $C_3$ is used as a scaling factor, resulting in relative value I for the intensity:

$$I=C_3 U_{avg}$$

The ninth step is to determine the absolute intensity value. FIG. 11 shows a number of intensity graphs. By continuing the example, the corrected value for the azimuth angle $A_{corr}$ is indicated on the X-axis scale with a fifth dotted line 44, parallel to the Y-axis. The processor calculates the relative value of the intensity I, according to the relationship $I=C_3 U_{avg}$ as stated above, which intensity I is indicated on the Y-axis scale with a sixth dotted line 45, parallel to the X-axis. Where the fifth 44 and sixth 45 dotted line intersect, an appropriate intensity curve is selected, where each curve represent a certain absolute intensity value.

Regarding the scaling factor coefficients $C_1$-$C_3$, they are used due to the fact that the internal calculations result in values which correspond to azimuth, elevation and intensity, but which magnitudes probably are not the desired.

Figure 7C:
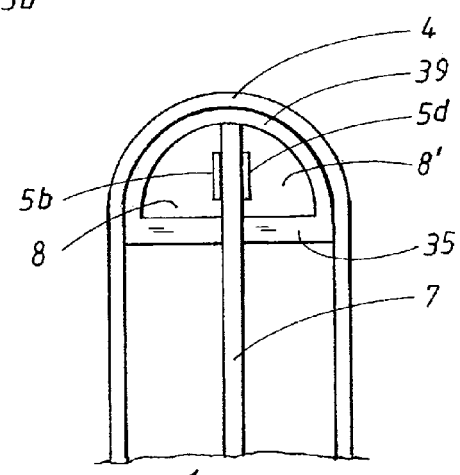

As stated above and shown in FIG. 7c, there is a small gap 39 between the shading elements 7, 8, 9 and the lens element 4, which gap 39 is filled with the diffusive compound. This results in that the output signal from every sensing element 5a-d changes smoothly and in that all the sensing elements 5a-d detect some photo radiation, irrespective of the azimuth angle. The outputs of the solar sensor 1 becomes quite sinusoidal and the curves p and q become quite similar to U1 and U2. In this case, the interim values p and q may be calculated more simply:

$$p=U1/U_{avg}-1$$

$$q=U2/U_{avg}-1$$

where $$U_{avg}=(U1+U2+U3+U4)/4$$

$U1/U_{avg}$ and $U2/U_{avg}$ are the normalized values of U1 and U2, and 1 is subtracted in order to get both positive and negative values for p and q. This is necessary because azimuth is calculated as arctan (p/q). In order to obtain azimuth values from 0° to 360°, p/q has to be between −1 and +1 due to trigonometry.

As the values of U3 and U4 appear in subsequent calculations only when $U_{avg}$ is determined, there is no need for establishing their values separately. This is used in a second embodiment described below.

Figure 12A:
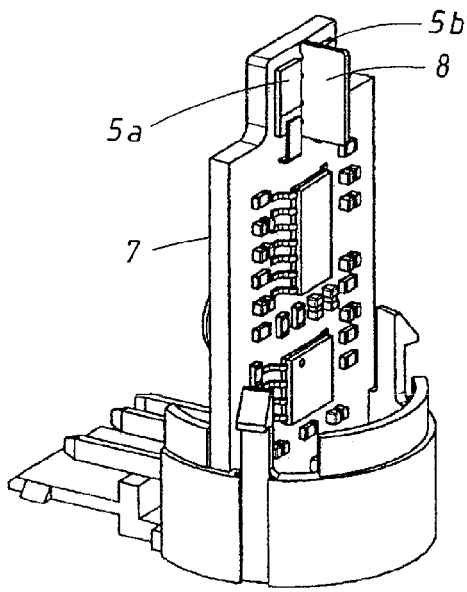
FIG. 12a shows a perspective view of a printed circuit board carrying the sensing elements used in a second embodiment, FIG. 12b schematically shows a top view of a solar sensor according to the second embodiment, FIG. 12c schematically shows a sectional side view of a solar sensor according to the second embodiment.
Figure 12B:
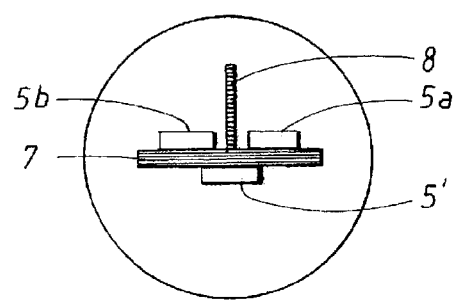
Figure 12C:
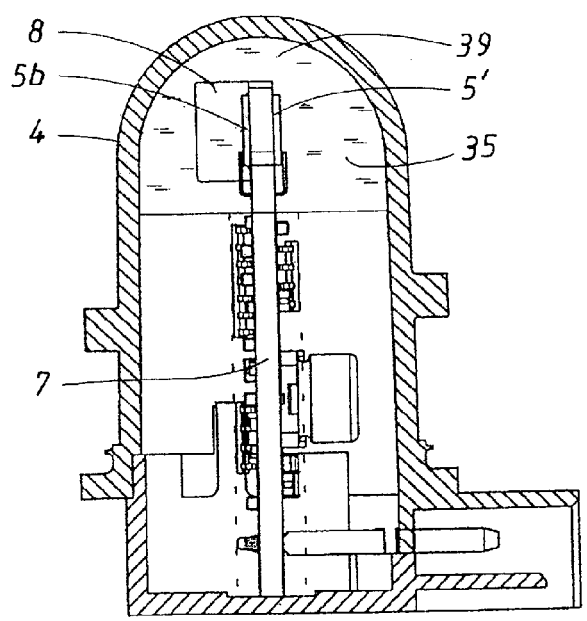

In this second, particularly preferred, embodiment, with reference to FIG. 12a-c, the dividing wall between the third and fourth sensing element is removed, and the third and fourth sensing element are replaced with a single sensing element 5' having the output signal Us. The other parts and properties are similar to those described with reference to FIG. 7a-c. There is a printed circuit board 7 and a shading element 8 between the first 5a and the second 5b sensing element.

The output signal Us will be very close to (U3+U4), i.e. the combined output of the previous third and fourth sensing element. The calculation for $U_{avg}$ will then be, with Us substituting (U3+U4):

$$U_{avg}=(U1+U2+2Us)/4$$

In other words, instead of U3 and U4, Us is used when using 3 sensing elements.

In the same way as stated for the previous embodiments above and shown in FIG. 12c, there is a small gap 39 between the shading elements 7, 8, 9 and the lens element 4, which gap 39 is filled with the diffusive compound. The gap in FIG. 12c is of another style, since the upper sides of the shading elements 7, 8, 9 is not dome-shaped here.

Figure 13:
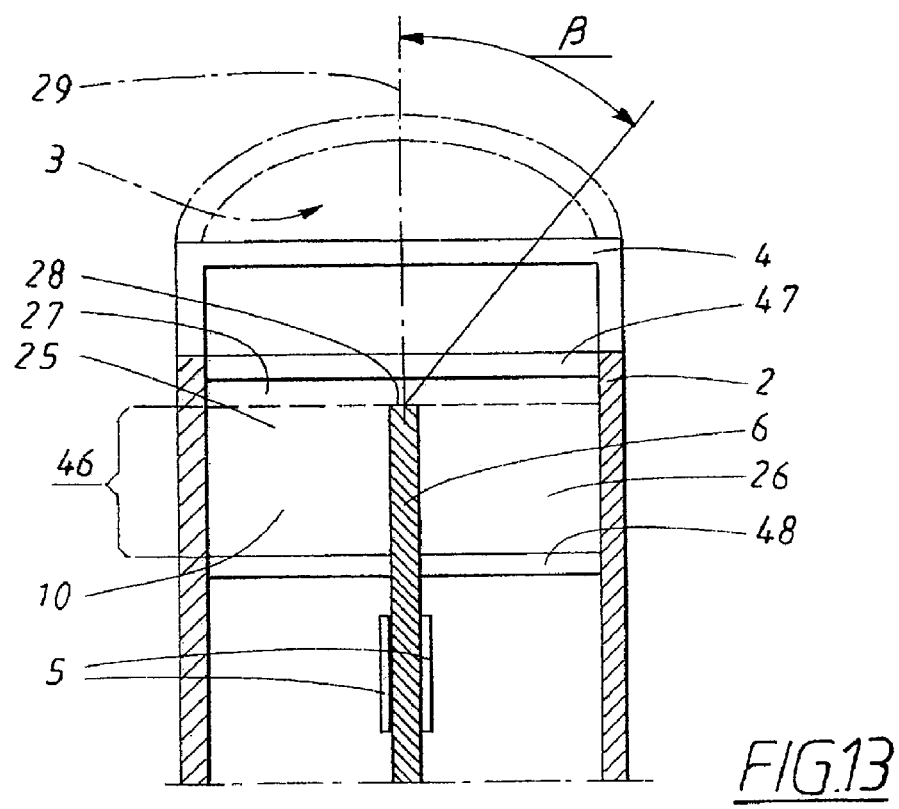
FIG. 13 shows a third embodiment of an photo radiation intensity directional sensor according to the invention.

In FIG. 13, a third embodiment of the invention is shown. The photo radiation intensity directional sensor comprises a housing 2 having an opening 3 covered by a transparent or translucent lens element 4. The photo radiation intensity directional sensor 1 comprises an array of sensing elements 5 sensitive to light, and a shading element 6 separating at least two of said sensing elements 5. In the shown embodiment the sensing elements 5 are positioned on opposite sides of a vertical division wall 6.

The housing 2 further comprises a chamber 10 containing a diffusive compound positioned between said lens and said array of sensing elements. The shading element 6 divides the chamber 10 into at least two sub compartments 25, 26, each containing one or several sensing elements 5.

In the shown embodiment the sensing elements are positioned inside the chamber 10 and are thus exposed by the liquid, which in a preferred embodiment has a protective quality reducing oxidation of the sensing elements 5.

In the embodiment shown in FIG. 13, the chamber 10 includes a top region 27 forming part of said at least two sub compartments. The top region 27 is vertically arranged in relation to said shading element 6 such that said shading element does not prevent light from impinging on at least a portion of each sub compartment in said top region. That is an upper edge 28, which is facing the lens element 4, of the shading element 6 is positioned below the top region 27. The top region 27 is thus positioned vertically above the upper edge 28 shading element.

The chamber also includes a bottom region 46 forming part of said at least two sub compartments 25, 26, where said bottom region is vertically arranged below an upper edge of said shading element.

Using the suggested configuration of the chamber in relation to the shading element, an output signal will be produced from each sensor at a range of an impinging angle β between 0° and 90° with a symmetry axle 29 of the housing 2 running in a plane defined by the shading element 6. The magnitude of the output signal from each sensing element will be dependent on the impinging angle β.

In a preferred embodiment of the invention, the photo radiation intensity sensor includes 1 a radiation filter transparent to a defined frequency interval, which radiation filter is arranged to block radiation outside said frequency interval from impinging on said sensing elements. The radiation filter is according to one embodiment of the invention formed by the diffusive compound. In an alternative embodiment the lens element is provided with a filtering capacity, which can be obtained by choice of material of the lens element or by arranging a cover sheet of a filtering material on the lens element. A further possibility is to include a separate second lens element, which could be formed either or both of the upper and lower partition walls 47, 48 of the chamber 10. In a preferred embodiment, the sensing element should be sensitive in the infrared region.

Figure 14:
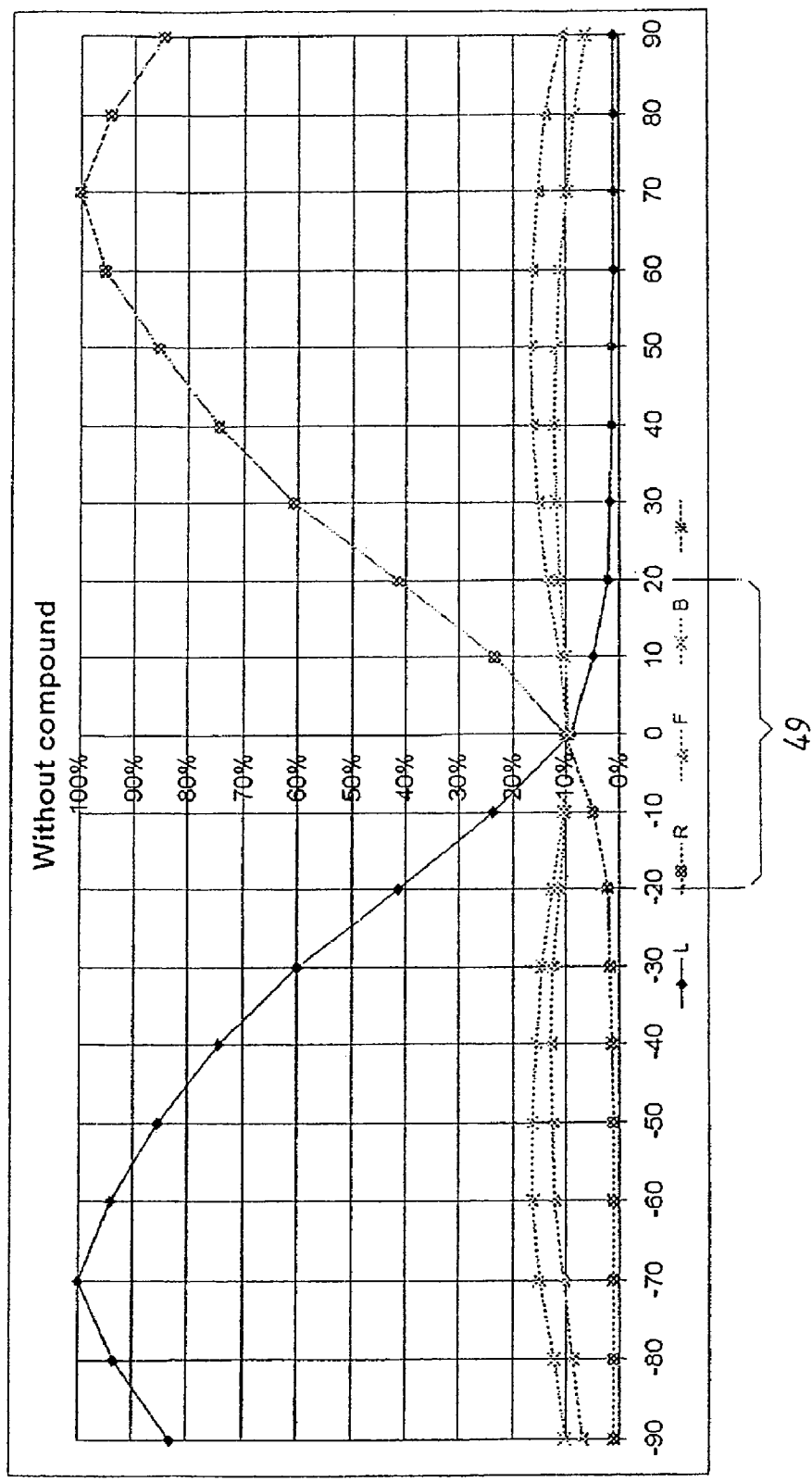
FIG. 14 shows an output signal from an photo radiation intensity directional sensor without inclusion of the diffusive compound.
Figure 15:
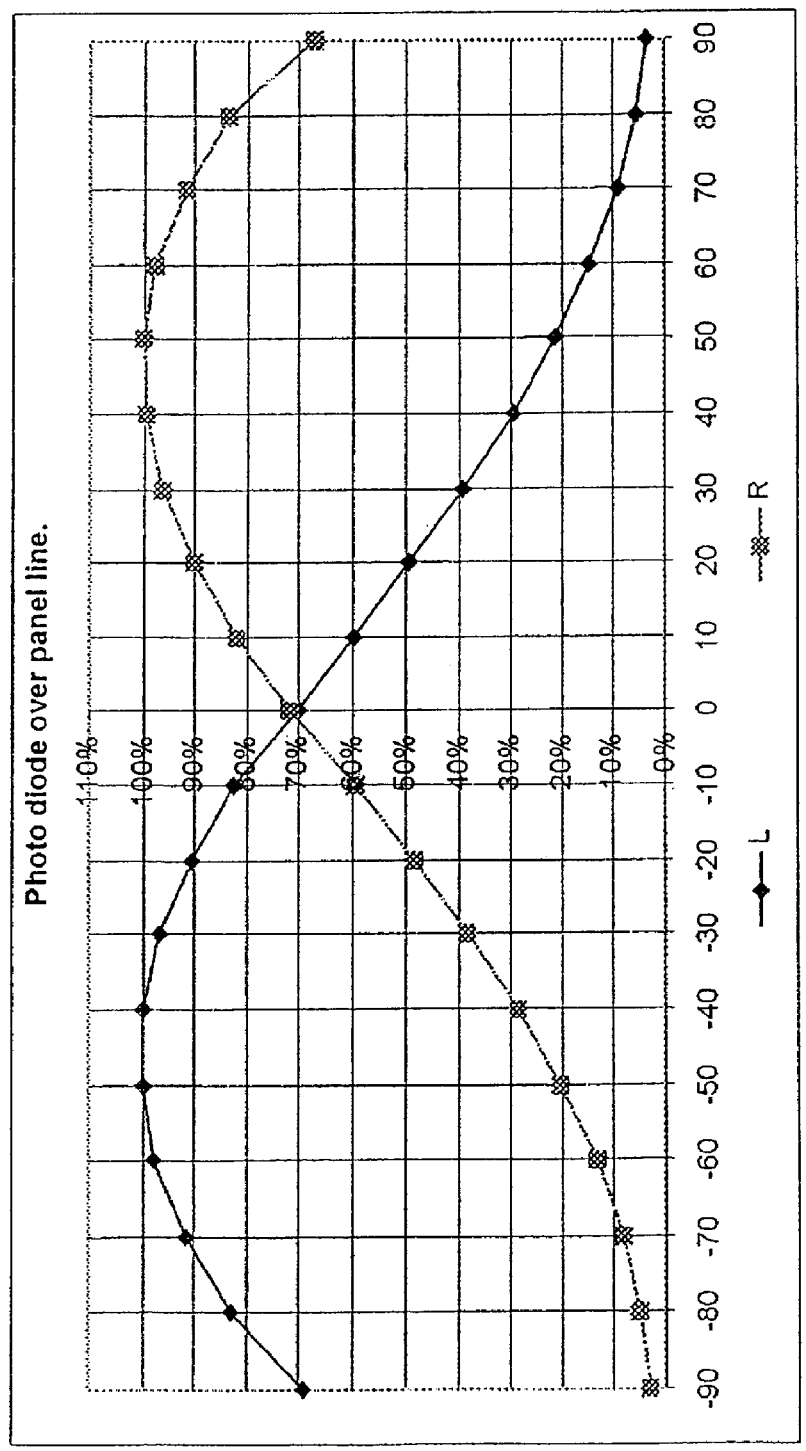
FIG. 15 shows an output signal from an photo radiation intensity directional sensor including a diffusive compound.

In FIGS. 14 and 15 the response curve from an array of sensing elements including a left and a right sensing element are shown. In the example shown in FIG. 14, the diffusive compound is not included. The overlapping region 49 of the signals from the left hand and right hand encompasses an impinging angle from −20° to +20°. In the example shown in FIG. 15, a diffusive compound is included. The overlapping region encompasses in this case the whole region from −90° to +90°. In order to produce an output signal having an acceptable signal to noise ratio the quota between the signals from the left and right sensor should not be too small or too large.

Generally, the invention relates to a photo radiation intensity sensor comprising a housing having a transparent or translucent portion and a circuit board placed in such way in the housing that one of its edges faces the transparent or translucent portion. At least a first and a second sensing element sensitive to radiation are placed at a first side of the circuit board, and at least a third sensing element sensitive to radiation is placed at a second side of the circuit board. These sensing elements are arranged for producing output signals which are used for estimating the sun radiation heating impact.

The housing further comprises a chamber containing a diffusive compound positioned between said housing and said at least one sensing element. Due to the diffusion of photo radiation that is obtained by means of the diffusive compound, the output signal of the sensing elements is essentially independent of the position of a surface normal of the sensing element in the housing in contrast to the situation when no diffusive compound is used. The diffusive compound may also have such properties that it serves as a protection for the electronic circuits that it is in contact with.

The manufacture of the solar sensors described is carried out by means of a pick-and-place machine, which places the sensing elements on the printed circuit board, the first and second sensing element on the first side of the printed circuit board and the third and fourth sensing element on the second side of the printed circuit board. Of course, the pick-and-place machine also places all other components used on the printed circuit board. The pick-and-place machine places flat connecting wires for subsequent reflow soldering, thus eliminating hand soldering.

The invention is not limited to the embodiments described above, but may vary freely within the scope of the appended claims.

It is to be understood that the calibration and measurements procedures described, are applicable for all embodiments covered by this application.

The invention claimed is:

1. A photo radiation intensity directional sensor comprising a housing having a transparent or translucent portion, and a printed circuit board placed in such way in the housing that one of printed circuit board edges faces the transparent or translucent portion, at least a first and a second sensing element sensitive to radiation are placed at a first side of the printed circuit board, where the first and second sensing elements are separated by a first flange, serving as a shading element, at least a third sensing element sensitive to radiation is placed at a second side of the printed circuit board, where said sensing elements are arranged to detect both the direction and the intensity of the radiation source and for producing output signals which are used for estimating the sun radiation heating impact, and where the printed circuit board is arranged in such a way that it functions as a shading element between the areas on its first and second side where the sensing elements are mounted.

2. A photo radiation intensity directional sensor according to claim 1, wherein a fourth sensing element is placed at the second side of the printed circuit board, where the third and fourth sensing elements are separated by a second flange, serving as a shading element.

3. A photo radiation intensity directional sensor according to claim 2, wherein the housing comprises a chamber containing a diffusive compound that is a potting, which compound is positioned between said housing and at least one of the first, second, third or fourth sensing elements.

4. A photo radiation intensity directional sensor according to claim 1, wherein the shading elements are arranged to prevent exposure of radiation to the sensing elements, which are separated by the shading elements, to a degree depending on the position of the photo radiation intensity directional sensor in relation to a source of photo radiation, said shading elements are thereby arranged for creating differences in output amplitudes from the sensing elements, which difference in amplitude is used for estimating the position of the source of radiation.

5. A photo radiation intensity directional sensor according to claim 3, wherein the shading elements divide said chamber into sub compartments, each containing one or several sensing elements.

6. A photo radiation intensity directional sensor according to claim 5, wherein the chamber includes a top region forming part of said sub compartments, where said top region is vertically arranged in relation to said shading elements such that said shading elements do not prevent photo radiation from impinging on at least a portion of each sub compartment in said top region.

7. A photo radiation intensity directional sensor according to claim 6, wherein said top region is positioned vertically above said shading elements.

8. A photo radiation intensity directional sensor according to claim 5, wherein said chamber includes a bottom region forming part of said at least three sub compartments where said bottom region is vertically arranged below an upper edge of each of said shading elements.

9. A photo radiation intensity directional sensor according to claim 3, wherein said sensing elements are positioned inside said chamber and being exposed to said diffusive compound.

10. A photo radiation intensity directional sensor according to claim 9, wherein said compound is arranged to preserve said sensing elements from oxidizing.

11. A photo radiation intensity directional sensor according to claim 3, wherein the printed circuit board carries further electronic circuits, and is positioned at least partly inside said chamber such that said electronic circuits and sensing elements are protected from negative influence on the environment by the diffusive compound.

12. A photo radiation intensity directional sensor claim 1, wherein said photo radiation intensity sensor includes a radiation filter transparent to a defined frequency interval, which radiation filter is arranged to block radiation outside said frequency interval from impinging on said sensing elements.

13. A photo radiation intensity directional sensor according to claim 12, wherein said radiation filter is constituted by said compound.

14. A photo radiation intensity directional sensor according to claim 12, wherein said radiation filter includes a lens element.

15. A photo radiation directional intensity sensor according to claim 2, wherein said sensing elements are sensitive to at least one of infrared and visible light.

16. A photo radiation directional intensity sensor according to claim 3, wherein said diffusive compound is a liquid or a gel.

17. The sensor according to claim 1, wherein the printed circuit board is oriented vertically in the housing, wherein the flange is oriented vertically in the housing and extends outwardly of the printed circuit board, wherein the first, second, and third sensors are positioned to extend in a vertical plane, respectively, wherein the first and second sensors face in a direction different than the third sensor, wherein the printed circuit board and the flange are the only devices to shade at least one of the first, second, and third sensors, and wherein the first, second, and third sensors respectively produce signals that indicate the azimuth, intensity and elevation of sun radiation.

18. A photo radiation directional intensity sensor calibration method for a sensor having a housing with a transparent or translucent portion, a printed circuit board positioned in the housing, the printed circuit board having one edge facing the transparent or translucent portion, at least a first sensing element and a second sensing element sensitive to radiation being positioned at a first side of the printed circuit board, the first and second sensing elements being separated by a first flange, serving as a shading element, at least a third sensing element sensitive to radiation is placed at a second side of the printed circuit board, wherein said sensing elements are arranged to detect both the direction and the intensity of the radiation source and for producing output signals which are used for estimating the sun radiation heating impact, and wherein the printed circuit board is arranged in such a way that it functions as a shading element between the areas on its first and second side where the sensing elements are mounted, comprising:
    rotating the sensor 360° in azimuth and from 0° to 90° in elevation under a fixed light source, which rotation takes place in predetermined steps;
    measuring all the azimuth steps for each elevation step, where each measurement results in a value from each sensing element that is part of the sensor;
    saving the acquired data amount in the form of tables and comparing with those of an ideal solar sensor; and
    calculating correction coefficients from this comparison.

19. Calibration method according to claim 18, wherein calculating correction coefficients includes forming tables containing these correction coefficients, which tables are converted into graphs, and storing the tables in a digital memory for every individual solar sensor.

20. A photo radiation directional intensity sensor measuring method for a sensor having a housing with a transparent or translucent portion, a printed circuit board positioned in the housing, the printed circuit board having one edge facing the transparent or translucent portion, at least a first sensing element and a second sensing element sensitive to radiation being positioned at a first side of the printed circuit board, the first and second sensing elements being separated by a first flange, serving as a shading element, at least a third sensing element sensitive to radiation is placed at a second side of the printed circuit board, wherein said sensing elements are arranged to detect both the direction and the intensity of the radiation source and for producing output signals which are used for estimating the sun radiation heating impact, and wherein the printed circuit board is arranged in such a way that it functions as a shading element between the areas on its first and second side where the sensing elements are mounted, comprising:
    measuring the output values from each sensing element, and saving the measurement values to a digital memory;
    calculating an average value of the signal acquired from the sensing elements, which average value is proportional to the intensity of the detected radiation;
    calculating differences between output signals of opposite sensing elements;
    calculating normalized values p and q of the above differences by dividing them with the average value;
    calculating a first azimuth angle value $A_z = C_1 \arctan(p/q)$, where $C_1$ is a constant;

calculating a corrected azimuth angle value, using the calculated first azimuth value $A_z$ and using comparison with correction coefficients;

calculating a first elevation angle value $E=C_2\sqrt{p^2+q^2}$ where $C_2$ is a constant;

calculating a corrected elevation angle value, using the calculated first elevation angle value E and using comparison with correction coefficients;

calculating a first intensity value $I=C_3*$ the average value, where $C_3$ is a constant; and calculating a corrected intensity value, using the calculated first intensity value E and using comparison with correction coefficients.

21. Measuring method according to claim 20, wherein the correction coefficients are those which are determined by: rotating the sensor 360° in azimuth and from 0° to 90° in elevation under a fixed light source, which rotation takes place in predetermined steps; measuring all the azimuth steps for each elevation step, wherein each measurement results in a value from each sensing element that is part of the sensor; saving the acquired data amount in the form of tables and comparing with those of an ideal solar sensor; and calculating correction coefficients from this comparison.

22. The measuring method according to claim 21, wherein calculating correction coefficients includes forming tables containing these correction coefficients, which tables are converted into graphs, and storing the tables in a digital memory for every individual solar sensor.

* * * * *